Figure 1:
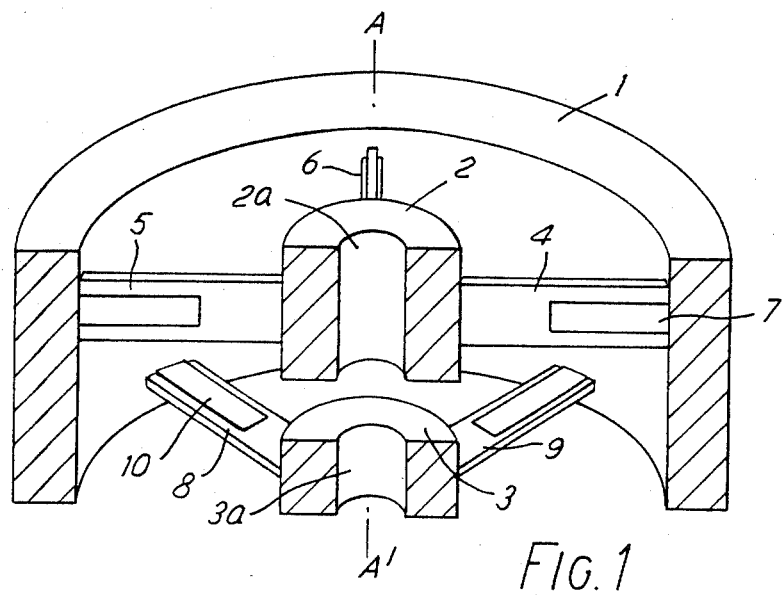

United States Patent [19]
Harwood et al.

[11] Patent Number: 4,577,513
[45] Date of Patent: Mar. 25, 1986

[54] STRAIN SENSING ARRANGEMENT

[75] Inventors: Alan R. Harwood, Hayes; Julie A. Ward, Camberley, both of England

[73] Assignee: EMI Limited, Hayes, England

[21] Appl. No.: 547,899

[22] Filed: Nov. 2, 1983

[30] Foreign Application Priority Data

Nov. 9, 1982 [GB] United Kingdom ............ 8231907

[51] Int. Cl.$^4$ .................... G01L 5/16; G01L 1/22
[52] U.S. Cl. ..................... 73/862.04; 414/730; 901/34; 901/46
[58] Field of Search ........... 73/862.48, 862.64, 862.69, 73/862.04, 862.05, 862.06, DIG. 2, 779; 901/9, 34, 46; 414/730

[56] References Cited

U.S. PATENT DOCUMENTS

| | | | |
|---|---|---|---|
| 3,921,445 | 11/1975 | Hill et al. | 73/862.04 |
| 3,939,704 | 2/1976 | Zipin | 73/862.04 |
| 4,088,013 | 5/1978 | Dahle et al. | 73/862.69 X |
| 4,487,078 | 12/1984 | Schmitz et al. | 73/862.06 |

FOREIGN PATENT DOCUMENTS

| | | |
|---|---|---|
| 0125426 | 9/1980 | Japan ............ 73/862.04 |
| 1450788 | 9/1976 | United Kingdom . |
| 1569348 | 6/1980 | United Kingdom . |
| 2060204A | 4/1981 | United Kingdom . |
| 2036376B | 12/1982 | United Kingdom . |

*Primary Examiner*—Charles Hart
*Attorney, Agent, or Firm*—Fleit, Jacobson, Cohn & Price

[57] ABSTRACT

A strain sensing arrangement includes a rigid annular ring, which is co-axial with an upper central boss and a lower central boss. An upper array of vertical, relatively flat, wide and flexible beams are connected to the upper boss and the ring and a lower array of horizontal beams are connected to the lower boss and the ring. Each of the beams are provided with a strain gauge on each side thereof for detecting any deflection of the beams.

When the arrangement is utilized in an assembly robot, the end of an arm of the robot is inserted downwardly into the upper boss and a gripper is inserted upwardly into the lower boss, so that the strain gauges can detect torsional and/or linear strain acting on the arrangement caused by relative rotation of the gripper with respect to the arm.

7 Claims, 3 Drawing Figures

STRAIN SENSING ARRANGEMENT

This invention relates to a strain sensing arrangement and in particular, though not exclusively, to such an arrangement which may be employed in assembly robots.

Robots of this kind, which are usually provided with a gripper at the end of an arm thereof, may not be capable of adapting to tolerances in the positioning of parts held by the gripper on an assembly, for example, correctly inserting a peg into a particular hole, and subsequent incorrect insertion of parts may lead to them becoming jammed or damaged.

To alleviate this problem, arrangements have been provided hitherto, which measure forces acting on the gripper produced by contact of the part in a collision with the assembly, which may be caused by misalignment of the part relative to its correct positioning on the assembly.

One such known arrangement, resiliently coupling the robot gripper to the arm, comprises four deflection bars arranged in a cross formation, each bar having a strain gauge bonded to each side thereof, so as to act as a force transducer.

However, such an arrangement requires each deflection bar to measure strain due to deflection in as least two out of three mutually orthogonal directions, thus generating outputs which may necessitate complex analysis.

It is therefore an object of the present invention to provide an improved strain sensing arrangement to those that have been provided heretofore.

According to the present invention there is provided a strain sensing arrangement comprising first and second arrays of spoke-like members, each array being connected to a respective co-axial central boss and the ends of said spoke-like members remote from said respective bosses being connected to a common support member, the arrays being axially spaced from each other, and each spoke-like member having strain sensing means connected thereto, the first array of members being arranged so as to detect strain produced in a circumferential direction relative to the co-axial bosses and the second array of members being arranged so as to detect strain produced in an axial direction relative to the co-axial bosses, said strain sensing means generating electrical signals indicative of the strain so detected.

Different combinations of the electrical signals may then be used to derive mutually orthogonal forces and corresponding torques by matrix multiplication.

The spoke-like members of the arrays are preferably angularly interleaved and, in a preferred arrangement, the members of each array are mutually orthogonal.

The members of each array preferably consist of substantially flat, wide and flexible beams, the oppositely-facing greater surfaces thereof each having the strain sensing means connected thereto.

The beams of the first array are preferably arranged in a substantially vertical plane parallel to the plane containing the axis of the co-axial bosses and those of the second array are arranged in a substantially horizontal plane perpendicular to the plane containing the axis of the co-axial bosses.

A strain sensing arrangement in accordance with the invention may be utilised in assembly robots by inserting the arrangement between the last joint of the robot arm and the robot gripper in the form of a force/torque transducer for the robot.

It may therefore be envisaged that, in the present invention, the strain sensing means connected to each beam of the first and second arrays may be used to generate electrical signals indicative of strain produced by rotation of the gripper, as well as strain on the gripper produced by collisions, and different combinations of the electrical signals may be used to derive, by matrix multiplication, three mutually orthogonal forces and corresponding torques acting on the gripper.

It may also be seen that, due to the flat nature of the flexible beams, they each basically only detect strain due to deflection in one of three mutually orthogonal directions, thus providing strain measurements which may be easily analysed.

Figure 2:
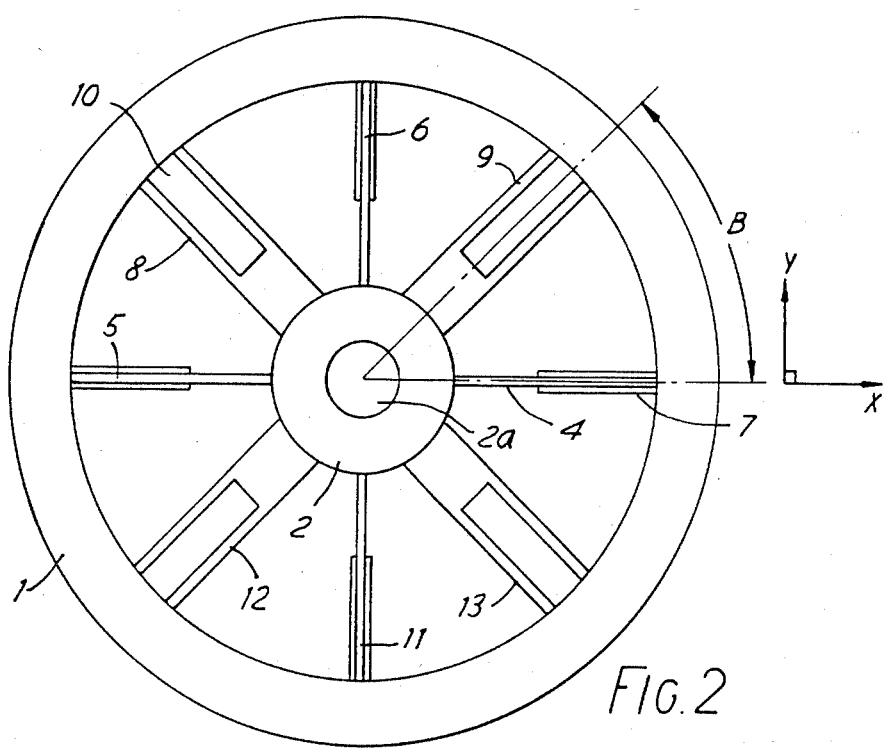
Figure 3:
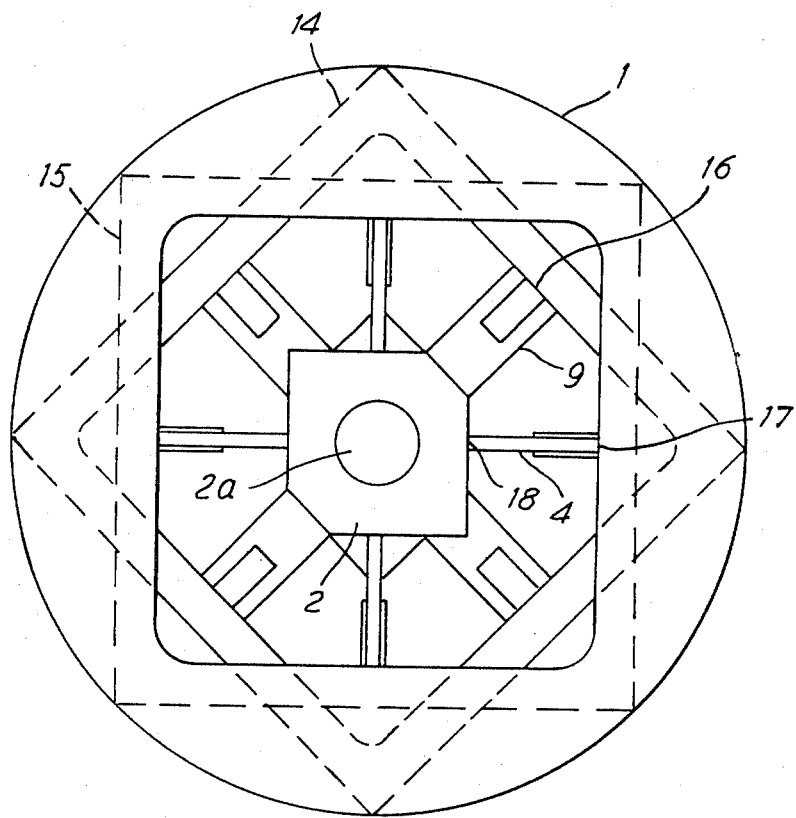

The invention will now be further described by way of example only with reference to the accompanying drawings, wherein:

FIG. 1 shows schematically a sectional view of a preferred embodiment of the invention, and FIG. 2 shows a plan view thereof, and FIG. 3 shows a plan view of an alternative embodiment of the invention.

Referring to FIG. 1, a strain sensing arrangement includes a rigid annular ring 1 as a support member with axis AA', an upper central boss 2 and a lower central boss 3, both bosses being co-axial with axis AA' and having a co-axial bore 2a in boss 2 and 3a in boss 3.

Connected to the upper boss 2 and to the ring 1 is an upper array of relatively flat, wide and flexible beams, three being shown respectively at 4, 5 and 6. A fourth beam, oppositely facing beam 6, is also provided in this array, but in the cross-section shown in FIG. 1, this beam is not visible.

It can be seen that beams 4, 5 and 6 are all arranged in a vertical position, that is, in a plane parallel to the plane containing axis AA'. The oppositely-facing wide surfaces of each beam 4, 5 and 6 are provided with strain sensing means, preferably consisting of semi-conductor strain gauges, one being shown at 7.

Similarly, connected to the lower boss 3 an to the ring 1 is a lower array of relatively flat, wide and flexible beams, 8 and 9. Two further beams are also provided in this array, but again these are not visible from the view in FIG. 1.

In this lower array, however, it can be seen that beams, 8 and 9, are arranged in a horizontal position, that is, in a plane perpendicular to that containing axis AA'. Again, all the beams are provided with the strain gauges on each side thereof, one such gauge being shown at 10 on beam 8.

Referring now also to FIG. 2, wherein like parts with respect to FIG. 1 are labelled with like reference numerals, a complete formation of beams in each array can be seen, the upper array consisting of vertical beams 4, 5, 6 and also 11, and the lower array consisting of horizontal beams 8 and 9 and also 12 and 13.

From the plan view of FIG. 2, it can also be seen that vertical beams 4, 5, 6 and 11 are mutually orthogonal and horizontal beams 8, 9, 12 and 13 are also mutually orthogonal, the beams of the upper and lower arrays being angularly interleaved, so that any angle between a horizontal beam and an adjacent vertical beam (angle B, for example, between beam 4 and beam 9) is approximately 45°. Such an angular arrangement of the beams is preferable because each beam is then made relatively easily accessible, should, for example, any repair work or other alterations need to be carried out on the strain gauges provided thereon, as well as providing ease of manufacture.

When such an arrangement in accordance with the invention is utilised in an assembly robot, the end of an arm of the robot (not shown in the drawings) can be inserted downwardly into bore 2a and a gripper (also not shown) for the robot can be inserted upwardly into bore 3a, thereby using the arrangement in the form of a force/torque transducer for the robot. The bores 2a and 3a are preferably co-axial, so as to maintain the known axis of the gripper.

The strain gauges, bonded to each side of each beam, are connected in pairs, so that they can detect any deflection of the flexible beams, the deflection representing misalignment of a part held in the gripper relative to its correct positioning on an assembly and/or misalignment of the assembly itself, and produce electrical signals indicative thereof, each flexible beam substantially only detecting deflection in one of three mutually orthogonal directions, two being shown as X and Y on FIG. 2 and the third being perpendicular to the plane of the paper with respect to FIG. 2.

Deflection of the vertical beams 4, 5, 6 and 11 of the upper array, due to their flat nature would only be substantially caused by movement of the gripper relative to the arm in a circumferential direction with respect to the annular ring 1, which is kept rigid. Strain gauges on these beams, one being shown at 7, would therefore be detecting torsional strain or torque acting on the arrangement caused by relative rotation of the gripper with respect to the arm.

Deflection of the horizontal beams 8, 9, 12 and 13 of the lower array would, likewise, only be substantially caused by movement of the gripper relative to the arm in a linear direction parallel to axis AA'. Strain gauges on these beams, one being shown at 10, would therefore be detecting linear strain caused by relative linear movement of the gripper with respect to the arm. This linear movement may occur when a part which is to be mounted on an assembly, being held in the gripper, collides with the assembly, instead of, for example, being correctly inserted into a required hole therein.

The electrical signals generated by each of the strain gauges can then be used, in different combinations, to derive three mutually orthogonal forces and corresponding torques acting on the gripper by matrix multiplication.

An advantage of using flexible beams, that are relatively wide and flat, is that they are flexible in substantially one direction only, so that a relatively high surface strain is ensured in the required direction, whilst the beam remains substantially rigid in all other directions. The flat nature of the beams also provides improved temperature compensation, because any temperature difference between the two wide surfaces of each beam should be relatively small.

Another advantage of the arrangement in accordance with the present invention is that it is relatively light and compact, this being substantially aided by the use of small semi-conductor strain gauges, so that the arrangement should not interfere with the operation of the robot in any way.

The preferred embodiment of the invention comprises a total of eight flexible beams, as this number has been found to produce strain measurements that can easily be analysed. However, the number of beams is not restricted by the invention, so that alternative numbers may be used in alternative angular formations.

Additionally, in the preferred embodiment, the annular ring, provided as the support member, is approximately of diameter 95 mm, of depth 18 mm, and is manufactured from aluminium, but, of course, alternative sizes and materials for the support member, as well as alternative configurations thereof, may be incorporated in the present invention.

The arrangement in accordance with the invention is also preferably formed from a single piece of metal, so as to reduce the possibility of hysteresis.

Alternative devices, which act substantially as force transducers, may also be utilised instead of semi-conductor strain gauges, for example, foil strain gauges may be used.

FIG. 3 shows an alternative configuration of the support member wherein triangular cut-out portions, two being shown at 14 and 15, are formed in the annular ring 1, so that each beam is joined to a substantially flat surface of the support member rather than to a curved surface, as, for example, beam 9 of the lower array joins flat surface 16 substantially at right angles thereto and beam 4 of the upper array joins flat surface 17 also substantially at right angles thereto.

It is also preferable in this embodiment that the central bosses 2 and 3 are shaped so that each beam joints the respective boss at a substantially flat surface thereof, such as beam 4 of the upper array joining boss 2 at flat surface 18 thereof.

We claim:

1. A strain sensing arrangement comprising
a first support member,
two further support members arranged coaxially with respect to the first support member,
a first array of beam members interconnecting said first support member and one of said further support members,
a second array of beam members interconnecting said first support member and the other of said further support members, and respective strain sensing means associated with the beam members of the first and second arrays for sensing relative axial displacement of the first support member and said one of the further support members and relative angular displacement of the first support member and said other of the further support members and for generating electrical signals indicative of angular and/or axial displacements which are sensed.

2. A strain sensing arrangement as claimed in claim 1 wherein said beam members of the first and second arrays respectively are angularly interleaved.

3. A strain sensing arrangement as claimed in claim 1 wherein said beam members of each array are mutually orthogonal.

4. A strain sensing arrangement according to claim 1 wherein said further support members comprise coaxial bosses arranged within the first support member.

5. An assembly robot including an arm, a gripper and a strain sensing arrangement according to claim 1 interconnecting the arm and the gripper.

6. A strain sensing arrangement comprising
a first support member,
two further support members arranged coaxially with respect to the first support member,
a first array of flat, flexible beam members interconnecting said first support member and one of said further support members and being arranged to flex in response to relative axial displacement of said first support member and said one of the further support members, a second array of flat, flexible beam members interconnecting said first and the other of said further support members and being arranged to flex in response to relative angular displacement of said first support member and said other of the further support members, and strain sensing means responsive to flexing of the beam members to generate electrical signals indicative of an angular and/or axial displacement.

7. A strain sensing arrangement according to claim 6 wherein the strain sensing means are provided on oppositely facing surfaces of each beam member.

* * * * *